United States Patent Office 3,029,165
Patented Apr. 10, 1962

3,029,165
MALLEABLE-CORED HARD-SURFACING
WELDING ELECTRODE
Theodore E. Kihlgren, Berkeley Heights, and Leon M. Petryck, Cranford, N.J., assignors to The International Nickel Company, Inc., New York, N.Y., a corporation of Delaware
No Drawing. Filed Aug. 26, 1960, Ser. No. 52,022
6 Claims. (Cl. 117—206)

The present invention relates to a hard-surfacing coated welding electrode, and, more particularly, to a hard-surfacing welding electrode having a malleable core, a special carboniferous flux coating and having satisfactory electrode performance and slag removal characteristics.

Heretofore, the art has recognized a need for an all-position, coated welding electrode having a malleable core capable of producing hard, wear-resistant and abrasion-resistant surfaces on metal parts of a special ferrous composition containing controlled amounts of nickel, chromium, silicon and carbon. Although attempts were made to provide such a coated electrode, none, as far as we are aware, was entirely successful when carried into practice on a commercial scale.

It has now been discovered that hard, wear-resistant welds and overlays can be made on metals and alloys by employing a coated electrode comprising the combination of a malleable core having a special composition and having a special flux coating.

It is an object of the present invention to provide an improved, inexpensive, easily manufactured, malleable-cored, flux-coated, all position welding electrode suitable for A.C. and D.C. electric-arc production of high-carbon, hard, abrasion-resistant fusion deposits on metals and alloys.

Another object of the invention is to provide an improved hard-surfacing electrode which has a malleable core and a special flux coating containing, in novel combination, special proportions of ingredients, and which electrode is particularly adapted to provide metals and alloys with hard, smooth, sound, abrasion-resistant overlays.

The invention also contemplates providing a flux-coated welding electrode reasonably free from flux flaking and shredding during burn-off, and providing a combination of malleable core and flux having a satisfactory burn-off rate and electrode performance.

It is a further object of the invention to provide a special flux coating for a welding electrode used in producing hard, wear-resistant welds and overlays.

It is likewise within the contemplation of the invention to provide a flux-coated, hard-surfacing welding electrode that is usable in all welding positions including the overhead position.

Still another object of the invention contemplates an improvement in the method of overlaying metals and alloys with a hard, wear-resistant surface.

Other objects and advantages will become apparent from the following description of the invention.

Broadly stated, the present invention contemplates a coated welding electrode having a ferrous core and a flux coating. In general, the core is made of malleable ferrous metal which contains up to about 4% nickel, up to about 2% chromium, up to about 0.75% manganese, up to about 1% silicon, not more than about 1% carbon, not more than about 0.025% phosphorus, not more than about 0.025% sulfur, with the balance being essentially iron. The coating bonded to said core is a highly carboniferous carbonate-fluoride, e.g., limestone-fluorspar, flux containing controlled amounts of carbon and silicon, with each constituent of the flux being in a special proportion with the other constituents thereof. The coated welding electrode contains nickel in a range from about 2.3% to about 5% by weight of the electrode and chromium in a range from about 1.3% to about 3% by weight of the electrode so that together with the special constituents of the flux and the ferrous core wire a coated arc-welding electrode is obtained which provides hard, wear-resistant welds or overlays. In general, the nickel and chromium each may be present partly in the flux and partly in the core or may be present entirely in the core or entirely in the flux, under appropriate circumstances, as is pointed out hereinafter. The special coated electrode has good arc behavior and satisfactory slagging characteristics in all positions, including the overhead position, besides producing welds that are sound, smooth and free from cracks.

The dry flux of the coating contemplated by the present invention contains the following ingredients in the amounts set forth (in parts by weight of the dry flux):

TABLE I

| Ingredients: | Range |
| --- | --- |
| Alkaline earth metal carbonate | 25 to 40 |
| Alkaline earth metal fluoride | 15 to 30 |
| Carbon | 16 to 27 |
| Silicon as ferrosilicon | 15 to 20 |

Additionally, up to 10 parts by weight of strontium carbonate can be added to the dry ingredients so that all in all a total of up to 50 parts by weight of an alkaline earth metal carbonate, i.e., calcium carbonate, barium carbonate and strontium carbonate, can be successfully employed, with the proviso that any portion exceeding 40 parts by weight of calcium carbonate, barium carbonate and combinations thereof must be strontium carbonate. Advantageously, up to 6 parts by weight of bentonite can be added and incorporated with the flux. Preferably, carbon is added to the flux in the form of graphite of varying particle size, i.e., about 8 to about 12 parts of fine graphite by weight together with about 8 to about 15 parts of coarse graphite by weight. In order to avoid undesired side reactions of the silicon with other ingredients in the flux or binder, advantageously, the silicon is incorporated in the dry flux as a ferrosilicon alloy containing about 30% to about 98% silicon, with the balance essentially iron, thereby stabilizing the silicon with regard to the remainder of the flux.

It is essential that all of the foregoing ingredients of the dry flux composition be present in the amounts specified in order to provide a coated electrode having the required operating characteristics, including arc stability, slag characteristics, etc. The carbon and ferrosilicon contents in the flux coating not only contribute to the production of good electrode characteristics during the overlaying operation but also insure that the fusion deposit produced using the electrode will have a high carbon content, i.e., over 2% carbon. Both the specified carbon and silicon contents, in combination with the remainder of the electrode composition, contribute importantly to the production of the hard, wear-resistant overlays and welds provided in accordance with the invention. In addition, the specified carbon and silicon contents contribute to the recovery of nickel and/or chromium in the weld deposit without substantial losses across the arc.

In carrying the invention into practice, it is advantageous to use the particular ingredients of the dry flux in the amounts set forth in the following Tables II and III (in parts by weight of dry flux).

TABLE II

| Preferred Ingredients | Range | Example |
|---|---|---|
| Calcium Carbonate | 25–40 | 31 |
| Calcium Fluoride | 15–30 | 21 |
| Graphite, Fine [1] | 8–12 | 12 |
| Graphite, Coarse [2] | 8–15 | 10 |
| Silicon [3] | 15–20 | 18 |

[1] 98% through a standard 200 mesh screen.
[2] 50% through a standard 35 mesh screen onto a 65 mesh screen, remainder on 35 mesh screen.
[3] As a ferrosilicon alloy containing about 50% silicon.

The aforementioned dry flux of the coating can also desirably contain the following additional ingredients:

TABLE III

| Ingredient | Range | Example |
|---|---|---|
| Strontium Carbonate | 0–10 | 4 |
| Bentonite | 0–6 | 4 |

The ingredients used in making the flux are powdered ingredients. In general, the mixed ingredients should have a particle size of between 35 mesh and about 325 mesh, i.e., between about 0.0164 inch and about 0.0017 inch diameter, except for the particle size of the graphite which desirably will have particle size ranges hereinabove shown immediately below Table II.

A water dispersible binder is employed with the flux composition to provide a durable and hard coating on the malleable alloy steel core after drying and baking. This binder advantageously is of the silicate type. Optionally up to about 4 parts of invert sugar can be incorporated therein. For convenience, a proprietary invert sugar solution containing about 82% solids in water, i.e., a water solution of about 43° Baumé, such as "Mordex" may be used. However, other types of invert sugar solutions are satisfactory. The following Table IV gives the amounts (in parts by weight of the dry flux) of ingredients which can be used for the binder. It is to be noted, however, that ingredients of a different specific gravity than shown herein also can be used.

TABLE IV

| Ingredient | Range | Example |
|---|---|---|
| Sodium Silicate Solution (47.6° Baumé) | 10–20 | About 15. |
| Invert Sugar (43° Baumé, preferably "Mordex"). | 0–4 | About 2½. |
| Water | As needed for extrudability. | About 3½ (or as needed). |

The flux coating can be applied to the core wire in any suitable manner, e.g., by an extrusion process, and dried on the wire surface by suitable drying and/or baking. This results in a hard adherent coating of high mechanical strength relatively free from impairment under normal handling conditions. A satisfactory drying or baking treatment of the flux and binder mixture comprises a normal continuous oven drying treatment followed by a baking treatment for about two hours at about 600° F.

Examples of typical electrode dimensions (core diameter plus flux thickness) are given in Table V. All dimensions therein contained are in inches.

TABLE V

| Core Diameter | Electrode Diameter Range | Electrode Diameter Example |
|---|---|---|
| ⅛ | 0.19–0.22 | 0.19 |
| ⁵⁄₃₂ | 0.22–0.26 | 0.23 |
| ³⁄₁₆ | 0.25–0.28 | 0.26 |

However, it is permissible, as will be apparent to those skilled in the art, to vary considerably the core diameter-flux thickness relationships from those proportions given in the preceding table. However, the flux coating constitutes from about 15% to 30% by weight of the electrode.

For the purpose of the present invention, the core of the present electrode advantageously is made of a ferrous metal and/or alloy having sufficient ductility or malleability to permit commercial fabrication by hot and cold working operations. Provided the ferrous core is malleable, the actual core composition, exclusive of the carbon and silicon contents and any nickel and chromium in the core, is determined by the requirements of the particular application for which the electrode is employed. It is also within the scope of this invention to utilize a composite core, e.g., a core wire of one composition cladded with a metal or alloy of another composition to provide the required net composition. Table VI gives the compositions of metals and alloys suitable for core material in weight percentages.

TABLE VI

| Element | Broad Range | Preferred Range |
|---|---|---|
| Manganese | up to 0.75 | 0.45–0.6. |
| Nickel | up to 4 | 3.25–3.75. |
| Chromium | up to 2 | 1.4–1.75. |
| Silicon | up to 1 | 0.2–0.35. |
| Phosphorus | 0.025 max. | 0.025 max. |
| Sulfur | 0.025 max. | 0.025 max. |
| Carbon | up to 1 | 0.09–0.14. |
| Iron | balance, at least 90. | balance. |

The compositions and hardnesses of the deposits, of course, will vary somewhat depending upon the exact composition of the flux and the type of core wire employed. The weld deposits produced using this electrode have a martensite plus carbide structure. In addition, all weld deposits produced using the electrode of this invention will have hardnesses in the as-welded condition in the range of at least about 450 and up to about 760 Brinell, i.e., about 48 to about 66.5 Rockwell "C," and the ranges of the essential elements in the fusion deposits, in addition to the iron content, being within the ranges as shown by Table VII.

TABLE VII

| Ingredient | Carbon | Silicon | Nickel | Chromium |
|---|---|---|---|---|
| Weight Percent | 3 to 3.8 | 2 to 3.5 | 2.5 to 3.5 | 1 to 1.5 |

The compositions of the weld deposits as shown in Table VII can be variously attained by incorporating in the flux certain alloying ingredients in predetermined amounts in conjunction with a ferrous core wire of suitable composition. For example, the alloying ingredients may be present partly in the flux and partly in the core or may be present entirely in the core or entirely in the flux. Thus, nickel and/or chromium in powdered form can be added to the flux compositions of Tables I, II and III in such amounts that the composition of the weld deposits will fall within the ranges tabulated in Table VII. For example, nickel may be present in amounts, by weight of the dry flux, up to about 16 parts, e.g., 10 to 15 parts, and chromium up to about 10 parts, e.g., 5 to 7.5 parts. In all cases nickel is present in the electrode in a range from about 2.3% to about 5% by weight of the electrode, and advantageously about 4% by weight of the electrode, and chromium is present in the electrode in a range from about 1.3% to about 3% by weight of the electrode and advantageously about 2% by weight of the electrode.

For the purpose of giving those skilled in the art a better understanding of the invention and a better appreciation of the advantages of the invention, the following illustrative example is given:

Example

A commercially purchased SAE type 3312 nickel-chromium steel containing about 3.7% nickel, 1.5% chromium, 0.1% carbon, 0.4% manganese, 0.3% silicon and the balance iron except for usual impurities was used as the core wire. The dimensions of the core wire were varied as 1/8 inch diameter, 5/32 inch diameter and 3/16 inch diameter electrodes in the tests.

A flux consisting of about 31 parts by weight of calcium carbonate, about 21 parts by weight of calcium fluoride, about 4 parts by weight of strontium carbonate, about 12 parts by weight of fine graphite, i.e., having a particle size such that 98% passed through a standard 200 mesh screen, about 10 parts by weight of coarse graphite, i.e., such that about 50% passed through a standard 35 mesh screen onto a standard 65 mesh screen, about 18 parts by weight of silicon in the form of ferrosilicon containing 50% by weight of silicon, and about 4 parts by weight of bentonite was applied by extrusion to the foregoing malleable SAE type 3312 steel core wire using a binder consisting of about 15 parts by weight of the flux of sodium silicate (47.6° Baumé), about 2½ parts of invert sugar solution having a specific gravity of about 43° Baumé, and about 3½ parts by weight of water. The electrode thus constituted was oven dried and subsequently baked at about 600° F. for about two hours. The outside diameter of the coated electrode was made according to the ranges listed in Table V, supra.

The foregoing electrode was employed to provide an overlay on workpieces. The workpieces were 6″ x 6″ x ½″ sections of mild steel plate. In all cases, the overlays on the workpieces had 2 layers of beads and each bead having a width about 3 to 4 times the width of the electrode described hereinabove. The results of these tests are tabulated in Table VIII.

TABLE VIII

| Inch Dia. | Brinell Hardness [1] | Percent Weld Composition | | | | Remarks |
|---|---|---|---|---|---|---|
| | | Carbon | Silicon | Nickel | Chromium | |
| 3/16 | 717 | 3.12 | 2.26 | 3.28 | 1.33 | In all cases, satisfactory arc behavior and slagging characteristics, and the structures were martensitic. |
| 5/32 | 715 | 3.46 | 2.89 | 3.34 | 1.37 | |
| 1/8 | 732 | 3.56 | 3.37 | 3.02 | 1.37 | |

[1] Determined at top of second heads.

Besides the observed satisfactory welding characteristics using the electrode described, it is to be noted that the carbon recovery was very high and that there was very little loss of alloying ingredients such as nickel and chromium during this overlaying operation.

The present invention is particularly applicable for the economic production of hard-surfaces on metal parts, e.g., cast iron and low alloy steels, which are subjected to severe abrasive and erosive conditions. Thus, the present invention finds useful applications in hard-surfacing crusher rolls, bucket lips, mixer blades, pump impellers, bulldozer blades and other grader blades, crusher jaws, conveyor tables, guide bars, hoppers, fan blades, chutes and many other parts and equipment connected with such diverse industries as the agriculture, ceramic, mining, foundry, metal working, earth-moving, road building and lumber industries.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A welding electrode for hard facing having a ferrous core wire containing about 3.7% nickel, about 1.5% chromium, 0.1% carbon, about 0.4% manganese, about 0.3% silicon with the balance essentially iron and having a flux coating containing in parts by weight about 31 parts of calcium carbonate, about 4 parts of strontium carbonate, about 21 parts of calcium fluoride, about 12 parts of fine graphite, about 10 parts of coarse graphite, about 18 parts of silicon, about 4 parts of bentonite, and a silicate type binder; said electrode containing about 25% of flux coating by weight of the electrode.

2. A welding electrode for hard facing having a ferrous core wire containing from about 3.25% to about 3.75% nickel, from about 1.4% to about 1.75% chromium, from about 0.45% to 0.6% manganese, from about 0.2% to 0.35% silicon, from about 0.09% to about 0.14% carbon with the balance essentially iron and having a flux coating containing, by weight, about 31 parts of calcium carbonate, about 4 parts of strontium carbonate, about 21 parts of calcium fluoride, about 12 parts of fine graphite, about 10 parts of coarse graphite, about 18 parts of silicon, about 4 parts of bentonite, and a silicate type binder.

3. A welding electrode for hard surfacing having a ferrous core wire containing about 3.25% to 3.75% nickel, from about 1.4% to 1.75% chromium, from about 0.45% to 0.6% manganese, from about 0.2% to about 0.35% silicon, from about 0.09% to about 0.14% carbon with the balance essentially iron and having a flux coating containing in parts by weight of the flux about 25 parts to about 40 parts of calcium carbonate, up to about 10 parts strontium carbonate, from about 15 to about 30 parts calcium fluoride, from about 8 parts to about 12 parts of fine graphite, from about 8 parts to about 15 parts of coarse graphite, from about 15 parts to about 20 parts of silicon, up to about 6 parts of bentonite and a silicate type binder.

4. A welding material adapted for hard facing metal workpieces which comprises a ferrous body containing up to about 4% nickel, up to about 2% chromium, up to about 0.75% manganese, up to about 1% silicon, up to about 1% carbon, with the balance essentially iron, and a flux containing in parts by weight of the dry flux about 25 parts to about 50 parts of at least one alkaline earth metal and being correlated such that any calcium carbonate and barium carbonate does not exceed 40 parts by weight of the dry flux, from about 15 parts to about 30 parts of at least one alkaline earth metal fluoride, from about 16 parts to about 27 parts of carbon, from about 15 parts to about 20 parts of silicon, up to about 16 parts of nickel, up to about 10 parts of chromium, up to about 6 parts of bentonite and a silicate type binder; said electrode containing from about 2.3% to about 5% nickel by weight of the electrode, and from about 1.3% to about 3% chromium by weight of the electrode.

5. A welding electrode for hard facing comprising a steel core wire and a flux coating containing, by weight, about 31 parts of calcium carbonate, about 21 parts of calcium fluoride, about 4 parts of strontium carbonate, about 12 parts of fine graphite, about 10 parts of coarse graphite, about 18 parts of silicon, about 4 parts of bentonite and a sodium silicate binder; said electrode containing about 4% nickel by weight of the electrode and about 2% chromium by weight of the electrode.

6. A welding electrode for hard facing comprising a steel core wire and a flux containing, by weight, from about 25 parts to about 50 parts of at least one alkaline earth metal carbonate and being so correlated such that any calcium carbonate and barium carbonate does not exceed 40 parts by weight of the dry flux, from about 15 parts to about 30 parts of an alkaline earth metal fluoride, from about 16 parts to about 27 parts of carbon, from about 15 parts to about 20 parts of silicon, up to about 6 parts of bentonite and a sodium silicate binder; said electrode containing from about 2.3% to about 5% nickel by weight of the electrode, and from about 1.3% to about 3% chromium by weight of the electrode.

References Cited in the file of this patent

UNITED STATES PATENTS

| | | |
|---|---|---|
| 1,679,002 | Pilling | July 31, 1928 |
| 1,978,318 | Miller | Oct. 23, 1934 |
| 2,547,432 | Andrews | Apr. 3, 1951 |
| 2,745,771 | Pease et al. | May 15, 1956 |